United States Patent [19]
Kale

[11] Patent Number: 5,094,813
[45] Date of Patent: Mar. 10, 1992

[54] NON TOXIC SELF FLUXING SOLDERING MATERIALS

[76] Inventor: Sadashiv S. Kale, P.O. Box 756, South Amboy, N.J. 08879

[21] Appl. No.: 591,392

[22] Filed: Oct. 1, 1990

Related U.S. Application Data

[63] Continuation of Ser. No. 461,664, Jan. 8, 1990.

[51] Int. Cl.$^5$ .............................................. C22C 19/00
[52] U.S. Cl. .................................... 420/560; 420/557
[58] Field of Search ............................ 420/557, 660

[56] References Cited

U.S. PATENT DOCUMENTS

| | | | |
|---|---|---|---|
| 4,453,977 | 6/1984 | Burus | 420/560 |
| 4,695,428 | 9/1987 | Ballentine | 420/560 |
| 4,758,407 | 7/1988 | Ballentine | 420/560 |

*Primary Examiner*—Peter D. Rosenberg
*Attorney, Agent, or Firm*—Kenyon & Kenyon

[57] ABSTRACT

A low temperature, non-toxic soldering alloy of the following composition by weight:
- 2.80 to 3.50% copper
- 0.20 to 0.50% zinc
- 0.08 to 0.16% nickel
- 0.08 to 0.16% silver
- 95.68 to 96.84% tin.

2 Claims, No Drawings

NON TOXIC SELF FLUXING SOLDERING MATERIALS

This application is a continuation of application Ser. No. 461,664, filed Jan. 8, 1990.

BACKGROUND OF THE INVENTION

The present invention generally relates to soldering materials and more particularly to self fluxing, toxicity free materials especially suitable for joining of tubing, fittings, and fixtures used in plumbing.

Soldering materials having lead as a base have been proven to be toxic and therefore their use has been banned. Hence, there is a need for non-lead base soldering materials with the same characteristics as easy flow, good wettability and low temperature operation. Joints formed by such materials should also have good corrosion and physical strength characteristics. Non-lead base materials have been used in past to produce high temperature brazing alloys which are not suitable for plumbing or other operations requiring low temperature heating for joining. Moreover, they are expensive, making them unattractive for general purpose use. Other non-lead soldering materials which have been used in the plumbing industry have included other toxic materials such as cadmium and antimony, and are thus likewise unsuitable for joining piping and tubing using to transport drinking water.

The following patents are representative of the approaches which have been taken:

U.S. Pat. No. 4,357,162 relates to a soldering material based on silver (20 to 40%) with copper and tin. The material is stated to be useful in the semiconductor industry but obviously is too expensive for plumbing applications because of its large silver content.

U.S. Pat. Nos. 3,087,813 and 1,103,482 describe soldering materials with varying amounts of silver, tin, copper, and aluminum.

U.S. Pat. No. 4,778,733 provides details of soldering materials based on tin with silver and copper, and without lead or antimony whose toxic nature is noted. These materials are non-fluxing type and fluxing agents, however, are required to be added separately to get better joining properties of this group of materials. The small amounts of silver added, as in my self fluxing composition, are adequate to raise the surface tension so as to avoid spattering during soldering.

U.S. Pat. No. 2,004,372 and U.S. Pat. No. 2,864,733 in which compositions of high zinc content that are suitable for aluminum alloys, are described. In plumbing joints use of such compositions can promote brittleness. Amounts less than 0.5% Zinc are sufficient to ensure wettability of soldering area and produce a joint that is crack free and leakproof.

U.S. Pat. Nos. 4,695,428 and 4,758,407 disclose solder alloys which are primarily tin/antimony based. The latter patent also describes a tin based solder which includes copper, nickel and silver, but not zinc.

SUMMARY OF THE INVENTION

Most of the soldering materials used in the industry contain toxic materials like lead, antimony, cadmium, etc. therefore constitute serious health hazards when used to join drinking water tubings. Hence this invention describes a new soldering material capable of joining copper, stainless steel, and other tubing materials with much improved metallurgical and corrosion properties. Toxic materials such as lead and antimony and cadmium have been eliminated in this new alloy.

In addition to being non-toxic, this soldering material is blended with a unique fluxing agent to make it self fluxing paste thus eliminating the need for a separate fluxing operation during soldering. The new soldering material is essentially a tin base alloy with additions of such alloying materials as copper, nickel, zinc, and silver.

The present alloy in inexpensive making it attractive for use by professional plumbers and nonprofessionals alike.

When prepared in the manner described below and combined with a fluxing agent to form a paste applied to the joint, this material can be used with a low temperature flame in the range of 420° to 470° F., such as that provided by an ordinary butane burner, which enables the soldering materials to remain fluid until the entire joint is filled.

DESCRIPTION OF THE PREFERRED EMBODIMENT

The preferred soldering material of the invention comprises a unique alloy in powder form mixed with a fluxing agent such as rosin to form a paste. The alloy includes the following metals in the ranges specified:

| Alloying Elements | Weight Percent |
| --- | --- |
| Copper | 2.80 to 3.50 |
| Zinc | 0.20 to 0.50 |
| Nickel | 0.08 to 0.16 |
| Silver | 0.08 to 0.16 |
| Tin | Balance |

The alloy is formed by melting the above constituents together as, for example, in a gas fired, 1000 lb. furnace. The melted alloy is then atomized to form a powder by any suitable method well known in the art, an example being that disclosed in my U.S. Pat. No. 4,793,853 to produce powders of size finer than 150 mesh. Powders of the soldering material can be either accircular or spherical in shape and atomized using air, water or inert gas, as is known in the art. The atomization is followed by sizing using an appropriate sieve to remove to any larger particles. The powered alloy is then blended with rosin base flux in a suitable vessel such as a stainless mixer at low speeds.

The self fluxing product, following the practice enumerated above, was used for joining a variety of shapes of copper tubing. The paste was applied uniformly to the mating surfaces and then they were put in place. Simple flame heating by butane burner was employed and joints of exceptionally good quality were obtained. Similar procedures were also employed in joining of stainless tubing and sheets with equally good results. Corrosion properties of the joints were very good & that long exposure to humid conditions did not produce any pitting or electro chemical reactions. The strength of joints was found to be superior to the lead base solder joints.

I claim:

1. A low temperature, non-toxic soldering material comprising an alloy of the following metals by weight:
   2.80 to 3.50% copper
   0.20 to 0.50% zinc
   0.08 to 0.16% nickel
   0.08 to 0.16% silver
   95.68 to 96.84% tin.

2. The material of claim 1 wherein said alloy is atomized to form a powder of particle size smaller than 150 mesh and is mixed with a non-corrosive fluxing agent to form a paste.

* * * * *